United States Patent [19]
Moore et al.

[11] Patent Number: 5,454,394
[45] Date of Patent: * Oct. 3, 1995

[54] EMERGENCY SHUT-OFF VALVES

[75] Inventors: Glenn E. Moore; Paul B. Anderson, both of Cincinnati; Chester W. Wood, Milford; Lawrence R. Blasch, Cincinnati, all of Ohio

[73] Assignee: Dover Corporation, New York, N.Y.

[ * ] Notice: The portion of the term of this patent subsequent to Mar. 31, 2009 has been disclaimed.

[21] Appl. No.: 29,448

[22] Filed: Mar. 11, 1993

Related U.S. Application Data

[63] Continuation of Ser. No. 860,441, Mar. 30, 1992, Pat. No. 5,193,569, which is a continuation of Ser. No. 478,247, Feb. 9, 1990, Pat. No. 5,099,870.

[51] Int. Cl.$^6$ ................................................. F16K 17/40
[52] U.S. Cl. .................... 137/71; 137/68.1; 137/493.3; 137/493.9
[58] Field of Search .................... 137/68.1, 71, 72, 137/75, 79, 493.3, 493.9

[56] References Cited

U.S. PATENT DOCUMENTS

| | | | |
|---|---|---|---|
| 2,965,116 | 12/1960 | Boone et al. | 137/68.1 X |
| 3,209,773 | 10/1965 | Klaus | 137/68.1 |
| 3,378,021 | 4/1968 | Milo | 137/68.1 |
| 3,478,762 | 11/1969 | McCullough | 137/71 |
| 3,489,160 | 1/1970 | Moore | 137/68.1 X |
| 3,515,157 | 6/1970 | Milo | 137/68.1 |
| 3,606,900 | 9/1971 | Wunderlich | 137/68.1 |
| 3,630,214 | 12/1971 | Levering | 137/68.1 |
| 3,794,057 | 2/1974 | Badger | 137/68.1 |
| 4,064,889 | 12/1977 | Gayle et al. | 137/68.1 |
| 4,131,142 | 12/1978 | Barr et al. | 137/68.1 X |
| 4,483,359 | 11/1984 | Robertson | 137/68.1 |
| 4,596,263 | 6/1986 | Snider | 137/68.1 |
| 4,886,087 | 12/1989 | Kitchen | 137/68.1 |
| 5,099,870 | 3/1992 | Moore et al. | 137/68.1 |

OTHER PUBLICATIONS

Unpublished Letter from Shell Oil Company to manufactures, dated Aug. 27, 1987.

*Primary Examiner*—John Rivell
*Attorney, Agent, or Firm*—Kinney & Schenk

[57] ABSTRACT

An emergency valve is provided to shut off the flow of fuel in the event a fuel dispenser is struck with sufficient force to rupture the fuel conduit means therefor. The valve comprises a lower housing connected to a source of pressurized fuel and an upper housing connected to conduit means which extend to a dispensing nozzle. The upper housing has a groove which defines the plane of a weakened portion. When the impacted with a relatively high lateral force, the portion of the upper housing, above the groove, will separate, or break away. A normally open, main control, flapper valve is mounted in the lower housing. A poppet check valve is mounted in the upper housing. When the separable portion of the upper housing breaks away, both the flapper valve and the check valve automatically close to minimize spillage of fuel. A bleed valve is provided to relieve pressure in the fuel conduit means to which the separable portion of the upper housing is connected, in the event a fire occurs upon its breaking away. In one embodiment the check valve yieldingly engages a seat formed in the upper end of the upper housing, immediately above the notch and is opened by fuel flow pressure. In another embodiment the check valve is normally held open by a post projecting upwardly from a bridge mounted beneath the groove. In a third embodiment, the poppet valve is also held in an open position by a similar post and is engageable with a seat formed in the upper staff ace of the upper housing. The upper housing and check valve comprises a replacement unit which can be mounted on existing lower housing to provide the benefits of the present invention or to replace an upper housing when an accident occurs.

11 Claims, 5 Drawing Sheets

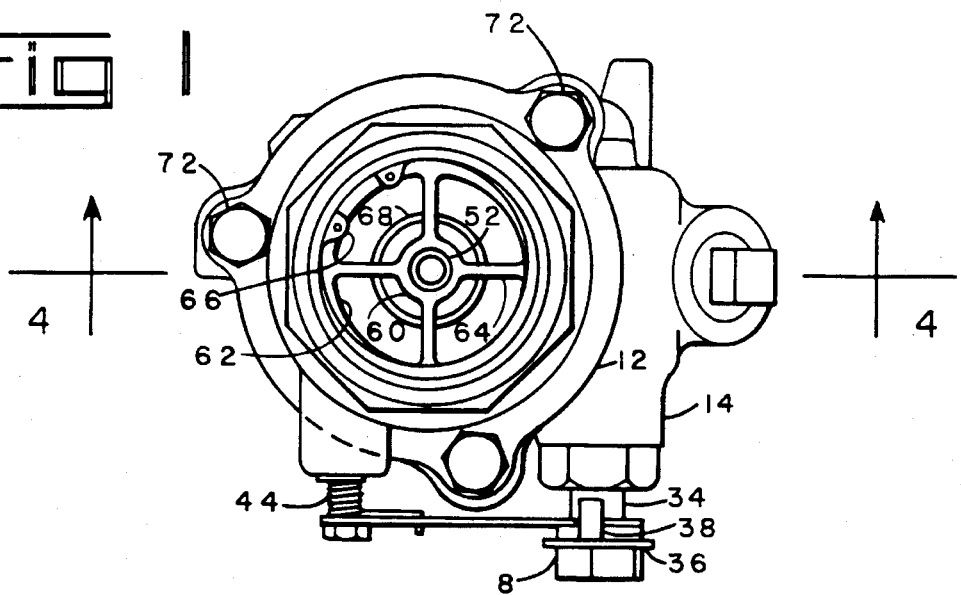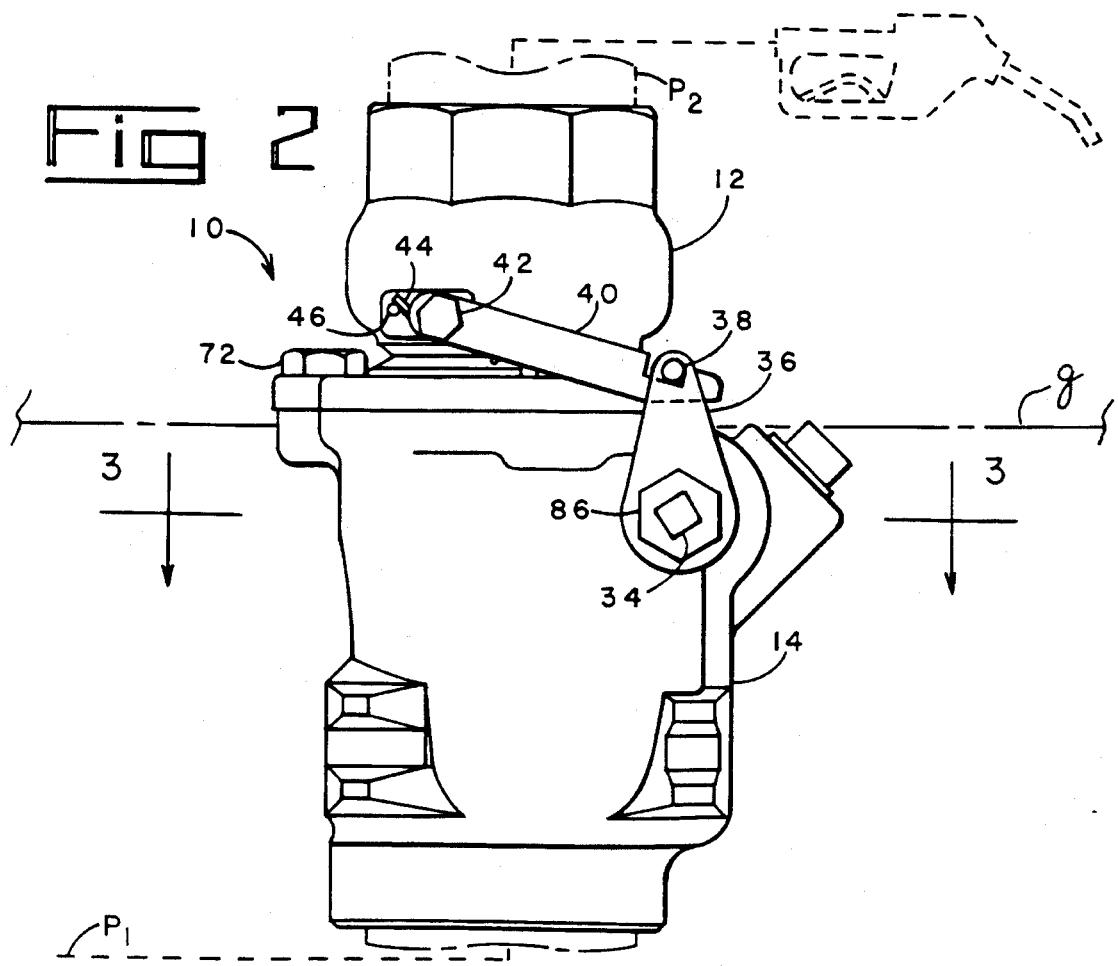

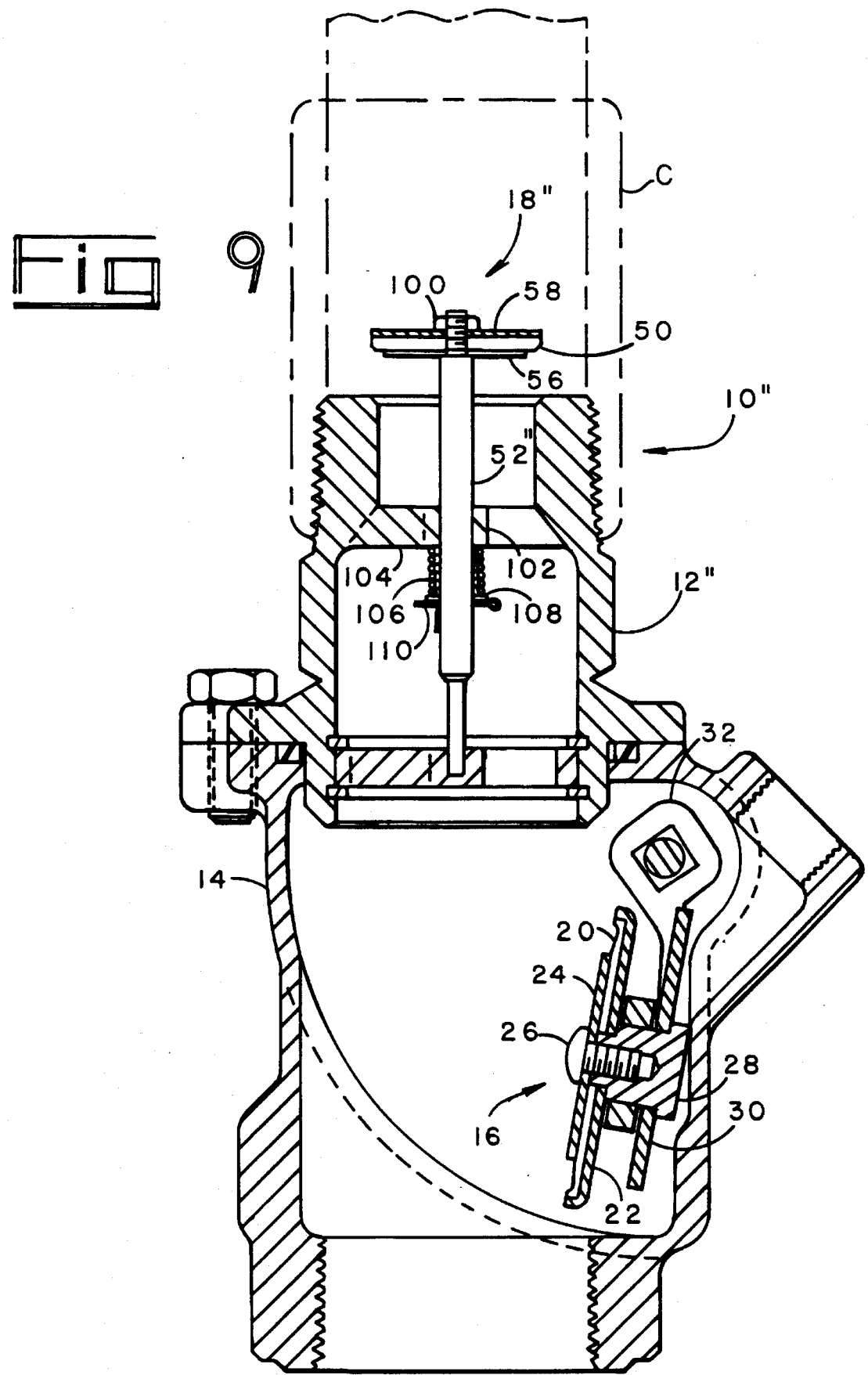

EMERGENCY SHUT-OFF VALVES

The present application is a continuation of application Ser. No. 860,441, filed Mar. 30, 1992, now U.S. Pat. No. 5,193,569, which was a continuation of application Ser. No. 478,247, filed Feb. 9, 1990 now U.S. Pat. No. 5,099,870.

The present invention relates to emergency shut off valves employed in the dispensing of gasoline and similar fuels.

While infrequent, vehicles do, for one reason or another, collide with fuel dispensing units at retail service stations. These units are connected to a source of pressurized fuel by conduit means which extend to a nozzle by which fuel is delivered into vehicle fuel tanks. When these units are struck by a vehicle or otherwise displaced, the fuel conduit means can be ruptured and gasoline spilled in a fashion which creates a very serious hazard.

This problem has been recognized in the prior art and it is an accepted practice to provide an emergency shut off valve at the base of a dispensing unit. The emergency valve is connected to the source of pressurized fuel, with its lower portion rigidly mounted relative to the dispensing unit. The upper portion of the emergency valve is then connected to the conduit means within the pump which extends to the nozzle. A weakened portion in the emergency valve provides a planned failure mode so that when the valve is subject to a lateral force, as when the dispensing unit is struck by a vehicle, the upper portion is separated, or broken away. A valve member, in the rigidly mounted portion, automatically closes upon separation of the upper portion so that further flow of fuel from the pressurized source is shut off and the hazard of fuel spillage minimized. An early version of fuel dispensing units incorporating this type of emergency shut off valve is found in U.S. Pat. No. 2,898,926—Tsiguloff.

The upper portion of the emergency valve comprises a replaceable unit so that it may be replaced in the event such an accident occurs. See, for example, U.S. Pat. No. 2,962,035—G. W. Wright, et al.

The referenced emergency valves also have the capability of shutting off fuel flow in the event a fire occurs at the site of a dispensing unit.

While minor, in comparison to uncontrolled flow of fuel from a pressurized source, there is, nonetheless, a significant amount of fuel in the portion of the conduit means extending through the dispensing unit to the dispensing nozzle. When emergency valves are broken off, this fuel spills on to the ground and also creates a hazard.

The broad object of the present invention is to reduce the hazards incident to an accident in which a fuel dispensing unit is struck by a vehicle, or the dispensing unit is otherwise impacted with sufficient force to rupture the fuel conduit means of a dispensing unit.

A more specific object of the present invention is to provide an emergency valve, which can be broken away with minimum spillage of fuel, to fulfill the foregoing end.

Another object of the present invention is to avoid additional hazards in attaining the above ends.

Yet another object of the present invention is to minimize the costs of making the benefits of the present invention available.

The foregoing ends are attained by an emergency valve adapted for installation at the base of a fuel dispensing unit. The lower end of the emergency valve is connected to a source of pressurized fuel and its upper end is connected to conduit means extending to a dispensing nozzle.

The emergency valve comprises a lower housing adapted to be rigidly mounted and to which the pressurized fuel source is to be connected. An upper housing is mounted on the lower housing and adapted to be connected to the conduit means extending to the dispensing nozzle.

The upper housing has a weakened portion defining a plane on which the upper portion thereof will separate when subjected to a predetermined lateral loading. A main control valve is mounted in the lower housing, with means being provided for latching the main control valve in an open position. The latching means are connected to the upper portion of the upper housing and release the main control valve for closure upon separation of the upper portion of the upper housing.

In accordance with the broad aspects of the invention, a check valve, preferably a poppet valve, is mounted in the upper, separable portion of the upper housing. Means are provided to maintain the poppet valve in a closed position when the upper portion of the upper housing is separated at the weakened portion. Thus, when an accident occurs and causes separation of the fuel conduit means, spillage of the fuel therein is prevented by the check valve.

In accordance with another aspect of the invention, bleed valve means, preferably mounted in the check valve, limit pressure in the conduit means to which the upper housing is connected. Thus, should a fire occur upon separation of the upper portion of the upper housing, any pressure rise in the dispensing unit fuel conduit means would be relieved to prevent a rupture of those conduit means.

In accordance with a more specific object of the invention, the check valve is a poppet valve and is resiliently maintained in a closed position and opened by fuel flow pressure in the deliver of fuel. Further, a conical valve seat may be formed in the upper portion of the upper housing. The poppet valve comprises an axially disposed stem and a sealing disc mounted on the stem and engageable with the seat. A bridge is mounted in the separable, upper portion above the valve seat. The valve stem is slidably mounted in the bridge. A compression spring is disposed between the bridge and the sealing disc to yieldingly maintaining the sealing disc in engagement with the valve seat.

In accordance with another feature of the invention, means limit displacement of the poppet valve in response to fuel flow to a finite open position. The upper housing has a chamber into which the sealing disc is displaced in the open position of the poppet valve. This chamber provides a fuel flowpath having an area substantially equal to the area of the flow path below the poppet valve, thereby minimizing losses as fuel flows therepast.

In accordance with another aspect of the invention, the check valve is a poppet valve comprising a stem and a sealing disc mounted on the stem. Stem bridge means guide the stem for axial movement within the upper housing. Spring means urge the poppet valve towards a closed position. Abutment means, mounted on the upper housing, beneath the weakened portion, maintain the poppet valve in its open position. The abutment means release the poppet valve for movement toward its closed position upon separation of the upper portion of the upper housing.

Further features of the invention are found in providing a conical valve seat in the upper portion of the upper housing beneath the stem bridge. The sealing disc engages the seat in the closed position of the poppet valve. The stem bridge means comprise a stem bridge mounted in the upper portion above the valve seat, with the valve stem slidably mounted in the stem bridge. The abutment means comprise an abutment bridge mounted in the upper housing, beneath the weakened portion, and a post mounted on the abutment bridge. The post is aligned with and engaged by the poppet valve stem, preferably in the plane of the weakened section of the upper housing. The spring means comprise a compression spring disposed between the stem bridge and the sealing disc to yieldingly maintain the stem in engagement with the post and maintain the sealing disc in engagement with the valve seat upon separation of the upper portion.

In accordance with another aspect of the invention, a conical valve seat is formed in the upper end surface of the upper housing. The sealing disc is mounted on the upper end of the poppet valve stem, above the stem bridge means. The abutment means comprise an abutment bridge mounted in the upper housing, beneath the weakened portion, and a post mounted on the abutment bridge. The post is aligned with and engaged by the poppet valve stem, which has retainer means disposed beneath the stem bridge means. The spring means comprise a spring disposed between the stem bridge means and the stem retainer means. The sealing disc is spaced above the valve seat by the post in the open position of the poppet valve and urged into engagement with the seat upon separation of the upper portion of the upper housing.

The lower housing of the described emergency valve is, generally, a permanently installed unit. The upper housing is a replaceable unit. Other aspects of the invention, are found in an upper housing and check valve combination, embodying the features above referenced, which forms a replacement unit that may be mounted on a permanently installed, lower housing. The replacement unit may be employed either to retrofit existing permanently installed units, or to restore the emergency valve to an operative condition after an accident has occurred.

The above and other related objects and features of the invention will be apparent from a reading of the following description of preferred embodiments of the invention, with reference to the accompanying drawings, and the novelty thereof pointed out in the appended claims.

In the Drawings:

FIG. 1 is a top view of an emergency shut off valve embodying the present invention;

FIG. 2 is an elevation of the emergency valve seen in FIG. 1;

FIG. 9 is a longitudinal section of another embodiment of the invention.

Figure 3:
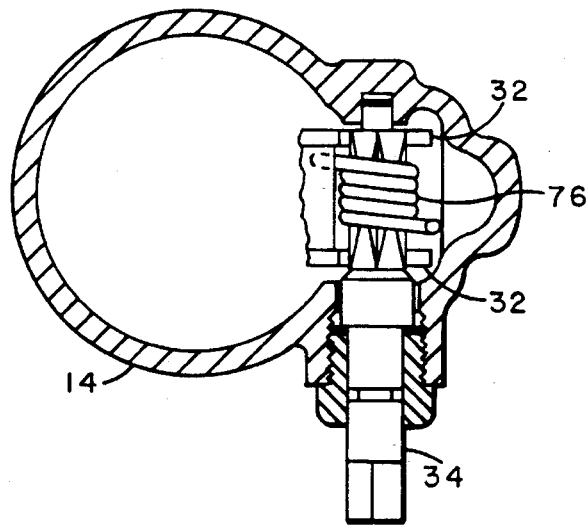
FIG. 3 is a section taken on line 3—3 in FIG. 2.

The emergency valve of the present invention, indicated generally by reference character 10 (FIGS. 1–4), is adapted to be mounted in a pedestal which supports a fuel dispensing unit. In a typical installation, a raised concrete island is found at a fuel service station, the top surface of which is indicated by a broken line g in FIG. 2. The lower, inlet end of the valve 10 is connected by a pipe $P_1$ which extends to a source of pressurized fuel. The upper, outlet end of the valve 10 is connected by a pipe $P_2$ to a fuel meter and, ultimately to a nozzle which is employed in discharging the fuel into the tank of a vehicle. The pipe $P_2$ and the dispensing nozzle form opposite ends of fuel conduit means associated with the dispensing unit which is mounted on the referenced concrete island.

The valve 10 comprises an upper housing 12 and a lower housing 14. The housings 12 and 14 compositely define a fuel flow through the valve 10 and have internal threads, respectively, at their upper and lower ends for connection with the pipes $P_2$ and $P_1$.

A main flow control, flapper valve 16 is mounted in the lower housing 14 and a dispensing unit control, poppet valve 18 is mounted in the upper housing 12. Both valves are shown in their open positions in FIG. 4.

The flapper valve 16 comprises a sealing disc 20, which is held against a holder 22 by a washer 24 by a screw 26. The screw 26 is threaded into a post 28 which is mounted on a bracket 30. Arms 32 project from the bracket 30 and have square openings which are received by the square section of a shaft 34 so that the bracket rotates therewith.

One end of the shaft 34 projects outwardly of the lower housing 14, with appropriate sealing means being provided to prevent leakage of fuel therepast. A lever arm 36 (FIGS. 1 and 2) is mounted on the outer end of the shaft 34, with a pin 38 projecting laterally therefrom. A cooperating lever arm 40 is pivotally mounted on the upper housing 12 by a screw 42. A torsion spring 44, coiled about the screw 42 and acting between a pin 46 and the arm 40, urges the arm 40 upwardly to engage a notch 48 with the pin 38. The flapper valve 16 is thus maintained in an open position.

The poppet valve 18 comprises a sealing disc 50 (FIG. 4) which is mounted on a stem 52 by a screw 54 which clamps the disc 50 between washer 56 and holder disc 58. The stem is slidable in the hub 60 of a bridge 62 which has connecting spokes 64 (see also FIG. 1). The bridge 62 has a shoulder which engages a corresponding shoulder in the housing 12 to axially position the bridge therein. A retainer ring 66 secures the bridge in this position. A spring 68, acting between the bridge 62 and the disc 58 urges the poppet valve 18 downwardly towards engagement with a conical seat 70 formed in the upper housing 12.

The lower housing 14 is embedded in, or otherwise anchored to, the concrete island on which the fuel dispensing unit is mounted, or otherwise rigidly mounted in a fixed position. The upper housing 12 is mounted on the lower housing 14 by screws 72, with a sealing ring being provided between their mating surfaces. The lower end of the upper housing 12 projects into the lower housing 14 to provide a valve seat 74 which is sealingly engageable by the flapper valve 16. The flapper valve 16 is urged into engagement with the seat 74 by a spring 76 coiled about the pin, but is normally held in its open position by the described linkage including lever arms 36 and 40.

Figure 4:
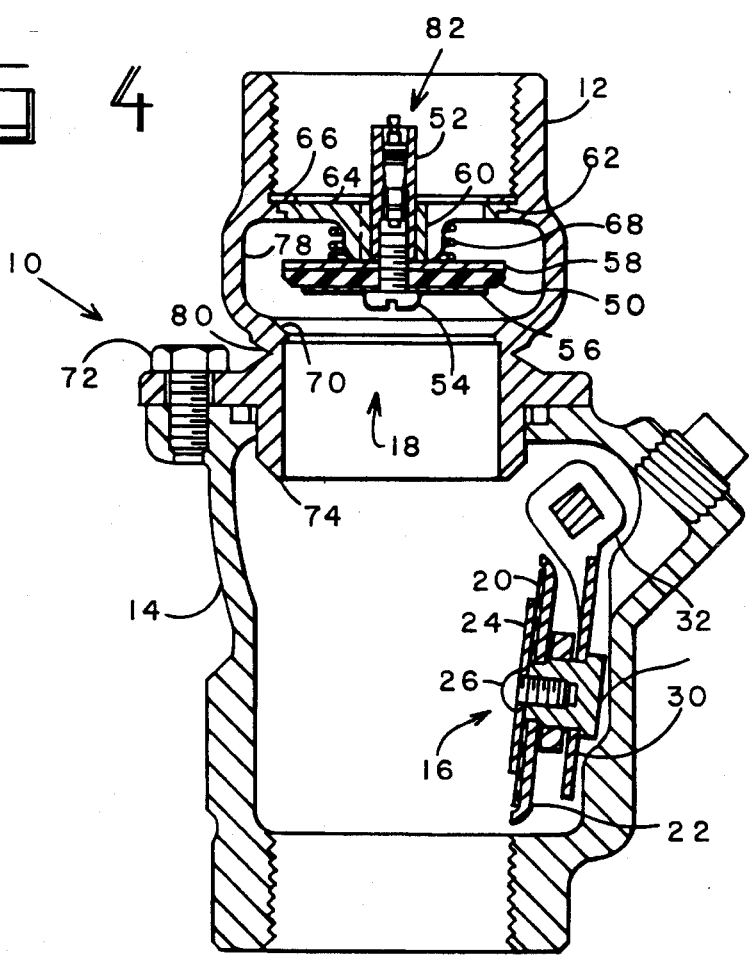
FIG. 4 is a longitudinal section taken on line 4—4 in FIG. 1.

FIG. 4 illustrates the emergency valve as it would be in the normal delivery of fuel. The main control valve is latched in an open position, permitting fuel to flow upwardly through the valve 10 for discharge from the nozzle of the dispensing unit. Fuel flow pressure displaces the poppet valve 18 to an open position, against the action of the spring 68. Upward movement of the poppet valve 18 is limited by engagement with the hub 60. The valve 18, and particularly the sealing disc 50 and holder disc 58 are thus positioned generally centrally of an enlarged chamber 78, formed in the upper housing 12. The diameter and height of the chamber 78 are sufficient to maintain the cross section of the fuel flow path essentially uniform from the upstream side to the downstream side of the valve 18. Pressure losses associated with the valve 18 are thus minimized.

The purpose and function of the valve 10 is to minimize loss of fuel in the event that the dispensing unit, into which it is incorporated, is impacted with sufficient force to fracture the fuel conduit. To this end, a planned failure mode is provided by a groove 80 formed in the upper housing 12, below the valve seat 70.

Figure 5:
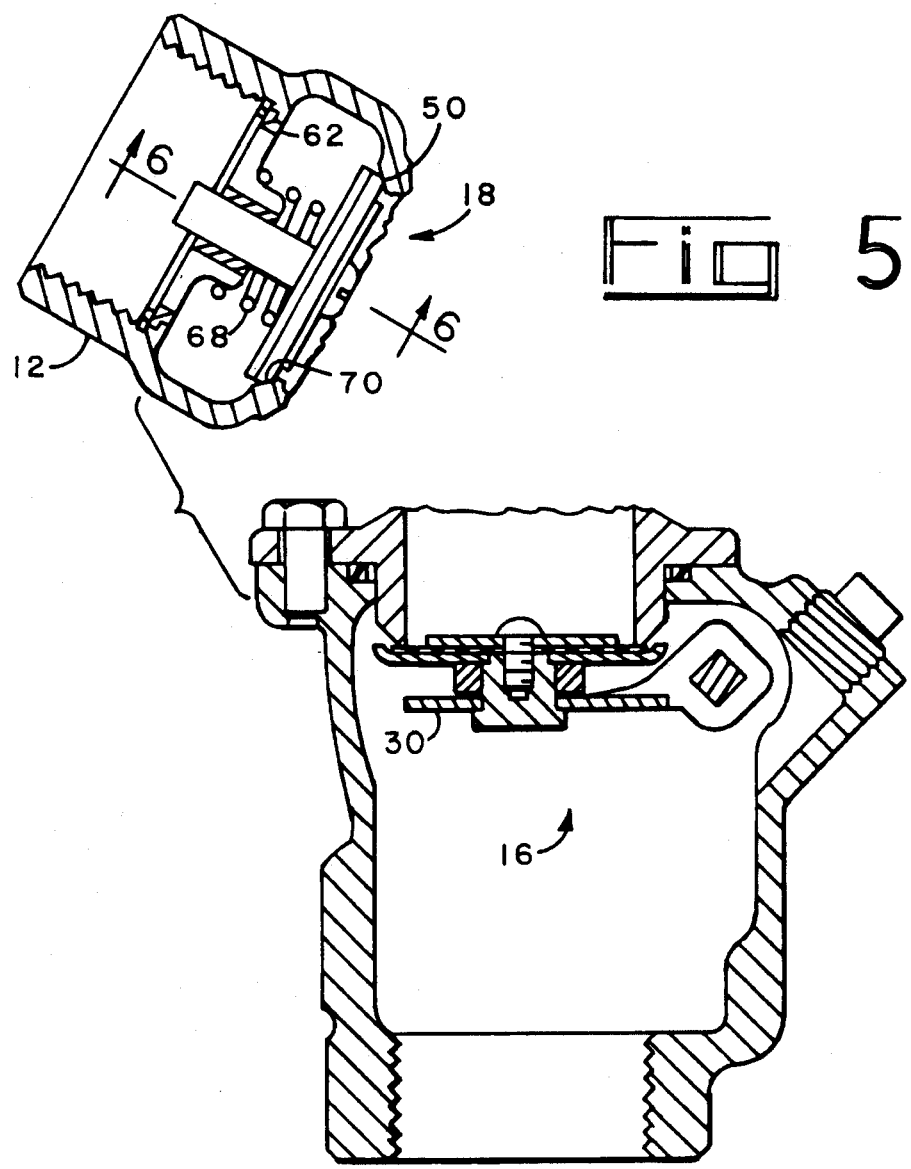
FIG. 5 is a section, similar to FIG. 4, showing the top portion of the valve broken off.

Bearing in mind that the lower housing 14 is rigidly mounted, when a predetermined lateral force is exerted on the upper housing 12, either directly or through the pipe $P_2$, the housing 12 fractures at the groove 80, as indicated in FIG. 5.

When the upper portion of housing 12 is thus separated, or broken away, the latching action of lever arms 36 and 40 is disabled and the flapper valve 16 is swung, by spring 76, to a closed position in which the seal 20 sealingly engages the seat 74. Further flow of fuel from the pressurized fuel source to which the pipe $P_1$ is thus shut off.

At the same time, the valve 18 is also automatically closed as the spring 68 engages the sealing disc 50 with the seat 70. The poppet valve 18 thus functions as a check valve so that fuel in the dispensing unit is retained therein and does not become the source of a fire hazard.

Nothwithstanding that the present valve greatly minimizes the spillage of fuel, the possibility of a fire being ignited, upon the dispensing unit being broken away, exists. In such an event, there will be a pressure rise in the fuel that is contained in the dispensing unit conduit means which comprises the broken away housing portion 12 at one end and the closed dispensing nozzle at the other end. This pressure rise has the potential of bursting the conduit means and aggravating the hazardous situation created by displacement of the dispensing unit.

Figure 6:
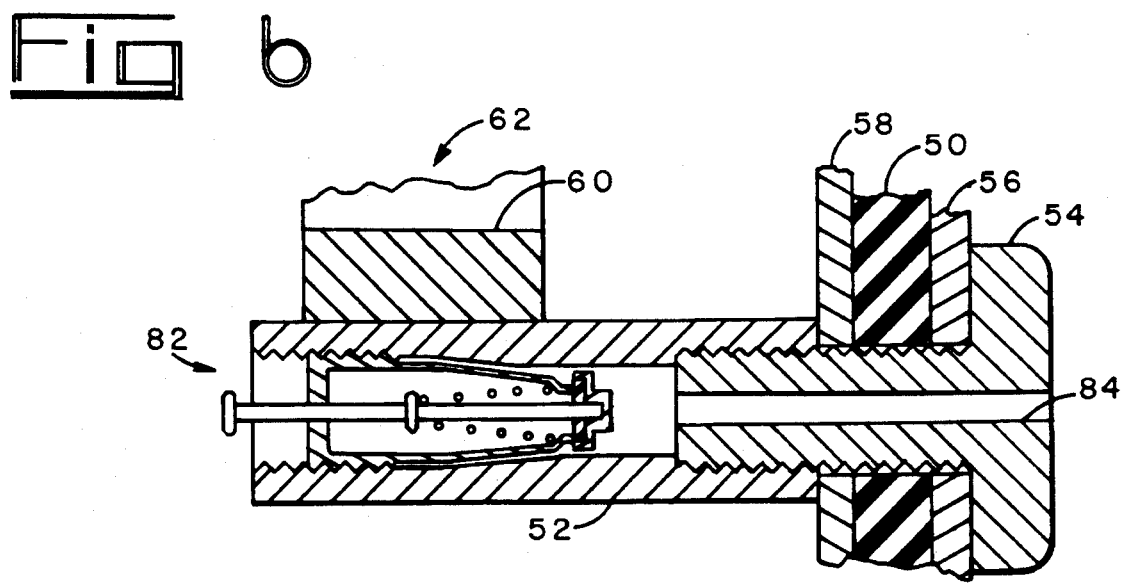
FIG. 6 is a section, on an enlarged scale, taken on line 6—6 in FIG. 5.

To minimize this problem, a bleed valve 82 (FIG. 6) is provided in the tubular valve stem 52, with a passageway 84 extending through the mounting screw 54. Conveniently, the valve 82 may a commercially available valve commonly used in the inflation of vehicle tires. The valve 82 is normally closed. In the event the pressure in the broken away portion of the housing 12 exceeds a given level approaching a pressure which would cause rupture of the broken away conduit means, the valve 82 opens and a relatively small amount of fuel bleeds from the passageway 84. When a sufficient amount of fuel has been bled to reduce conduit pressure to a safe level, the bleed valve closes. The amount of fuel bled for this purpose is inconsequential and has minimal, at most, potential for increasing the hazards incident to fire which has caused the pressure rise in the broken away conduit portion.

Means are also provided for closing the main control valve 16 in the event that a fire is ignited in the dispensing unit under circumstances in which the upper portion of the housing 12 is not broken away. To this end, a fusible metal hub 86 is interposed between the shaft 34 and the lever arm 36. When ambient temperature reaches a level indicative of a fire, the fusible hub softens to permit rotation of the shaft 34 and closing of the valve 16 by the torsion spring 76.

At this point it will be noted that prior art emergency valves include similar upper and lower housings. The lower housings of these prior art valves may be substantially identical with what has herein been described, including the provision of a main, flapper control valve. Likewise, the prior art valves may comprise substantially identical linkage means for normally latching the main control valve in an open position. Further, the valve seat for the main control valve may be provided by upper housing, which is grooved to provide the same type of planned failure mode.

The upper housing 12, thus may be retrofitted to the lower housings of existing emergency valves to attain the benefits of the present invention. It will also be apparent that the housing 12 is a replaceable unit. That is, if the upper portion should be broken away, a new housing 12, including the valve 18 and other components mounted thereon, would be installed on an existing permanently installed, valve unit which comprises the housing 14 to restore the valve 10 to its operative condition.

Figure 7:
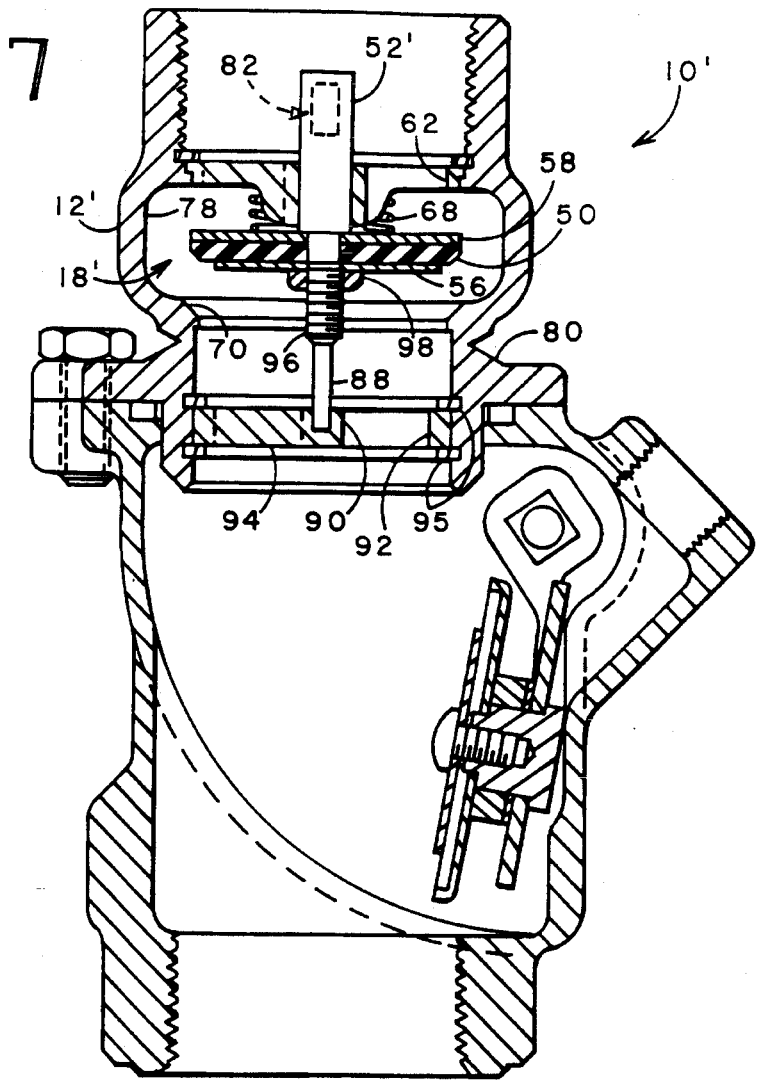
FIG. 7 is a longitudinal section of another embodiment of the invention.
Figure 8:
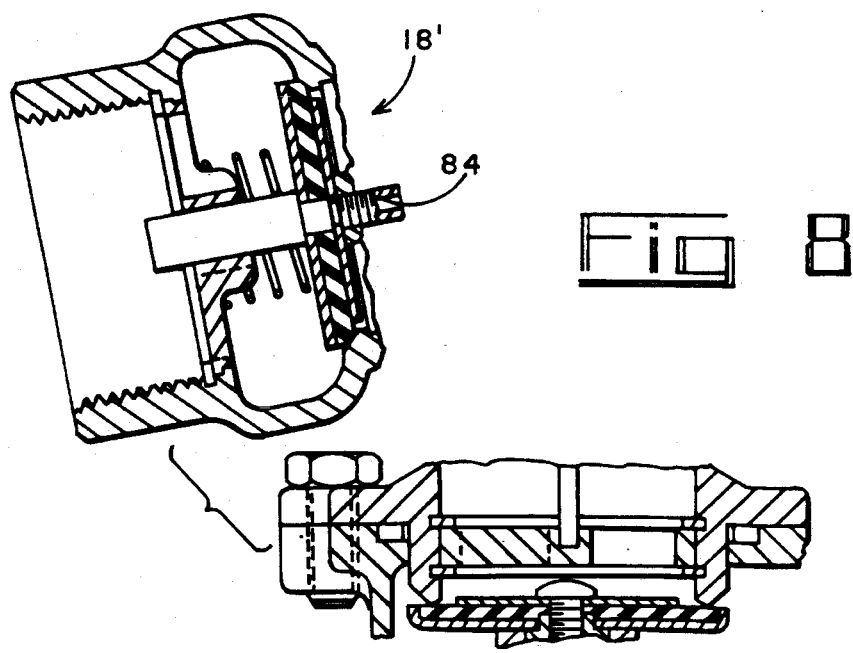
FIG. 8 is a section, similar to FIG. 7, showing the top portion of the valve broken off.

Reference is next made to FIGS. 7 and 8 for a description of another emergency valve 10', embodying the present invention. In this valve the same lower housing 14, main control flapper valve 18 and linkage means for latching the flapper valve in an open position are employed and indicated by the same reference characters as in the previous embodiment.

The valve 10' comprise a poppet valve 18' having certain components and structural features which are substantially identical with those found in the valve 18 and are identified by like reference characters as found in the description of the first embodiment.

The emergency valve 10' differs from the emergency valve 10 in the poppet valve 18' is normally maintained in an open position when the flapper valve 16 is latched in its open positions. To this end abutment means comprise a post 88 which projects upwardly from the central hub 90 of a bridge 92 which has spokes 94 to permit fuel to flow past the bridge. The bridge 92 is axially positioned in the housing 12' by retainer rings 95.

The poppet valve 18' is modified by providing a tubular stem 52' having a threaded extension 96 which is aligned with and engages the post 88. A nut 98 is threaded on the extension 96 and clamps sealing disc 50, washer 56 and holder disc 58 on the stem 52'. The stem 52 may be slidably mounted on bridge 62 which is mounted in the housing 12' as previously described. The valve 18' is urged downwardly by spring 68 to maintain the extension 96 in engagement with the post 88. The poppet is thus maintained in an open position, in chamber 78, in which flow losses are minimized.

The housing 12' has a groove 80 which, again, provides a planned failure mode. The groove 80 is disposed immediately below seat 70 which is engaged by the sealing disc 50 when the valve 18' is closed. Preferably, the upper end of the post 88 is disposed in the plane of the groove 80.

The valve 10' provides the same end function as the valve 10, in the event the dispensing unit in which it is incorporated is laterally displaced. Thus the upper portion of the housing 12' fractures at the groove 70 (FIG. 8). The stem extension 96 is released from the post 88, permitting the spring 68 to seat the sealing disc 50 in sealing engagement with the seat 70. At the same time, the valve 16 closes, as above described.

Bleed valve 82, mounted in stem 52' communicates with the passageway 84 which extends through the extension 96 to relieve pressure in the event a fire occurs.

Reference is next made to FIG. 9 for a description of an emergency valve 10" which is another embodiment of the invention, similar to the valve 10'. The valve 10" comprises an upper housing 12" and a lower housing 14 which, along with the main control valve 16 may be identical with the lower housing and valve described in connection with the first embodiment (FIGS. 1–4) and is identified by like reference characters. Likewise the same linkage mechanism may be employed to latch the valve 16 in an open position.

A poppet valve 18" is mounted on the housing 12", both of which comprise certain components and structural features common to the first two embodiments, which are identified by like reference characters respectively employed in those embodiments.

It will first be noted that the housing 12", at its upper end, has external threads which are adapted for connection with a coupling C, with the pipe $P_2$ then being threaded into the coupling C.

The poppet 18" comprises sealing disc 50, holder disc 58 and washer 56 which are mounted on a stem 52" by a nut 100 threaded onto its upper end. The sealing disc 50 is engageable with a conical seat 70" formed on the upper end of the housing 12". The stem 52" is slidably mounted in a hub 102 which is connected to the housing 12" by spokes 104, all formed integrally with the housing 12". The valve stem 52" is urged downwardly by a spring 106 disposed between the hub 102 and a washer 108. The washer 108 bears against a cotter pin which extends through a lateral hole in the stem 52".

A post 88 projecting upwardly from bridge 92 is yieldingly engaged by the stem 52" and maintains the valve 18" in its open position.

The valve 12" functions in the same general fashion as the valve 12'. In normal operation, the valve 16 is latched in its open position and the poppet valve 18" is maintained in an open position by engagement of the stem 52" with the post 88. When the dispensing unit, in which the valve 12" is incorporated, is subjected to a substantial lateral force, the upper end of the housing 12" fractures at a groove 80. Thereupon both the main valve 16 and the and poppet valve 18" close to minimize spillage of fuel. A bleed valve, although not so shown, may be incorporated in the valve 18".

The materials for the various components of the present emergency valves may be readily selected by those skilled in the art to serve the purposes and functions herein described. It will be mentioned that cast iron is the preferred material for the upper housings 12, 12' and 12" because of its fracturing characteristics.

The check valves 18, 18' and 18" provide means for retaining fuel in the conduit system of the dispensing unit in the event of a separation of the upper portion of the upper housing (12, 12' or 12") above groove 80. Check valves, usually spring assisted, prevent flow of fuel in a direction reverse to normal flow and can take various forms. The described poppet valves are preferred, with the valve 18 having the advantage that there is little or no possibility that it will fail to close upon the occurrence of such a separation.

Variations in the disclosed embodiments will occur to those skilled in the art within the spirit and scope of the present inventive concepts which are set forth in the following claims.

Having thus described the invention, what is claimed as novel and desired to be secured by Letters Patent of the United States is:

1. An emergency valve adapted for installation at the base of a fuel dispensing unit with its lower end connected to a source of pressurized fuel and its upper end connected to conduit means extending, through the dispensing unit, to a dispensing nozzle, said emergency valve comprising housing means defining a fuel flow path from the lower end of the valve to the upper end of the valve, the lower end portion of the housing means being adapted to be rigidly mounted, first and second valve means disposed in series flow relation in said fuel flow path, said housing means having a weakened portion defining a plane, intermediate the first and second valve means, on which the upper portion thereof will separate when subjected to a predetermined lateral loading, said first valve means and said second valve means both permitting the flow of fuel from the bottom of the housing means to the top thereof, when the housing means is intact;

said first valve means having a closed position in which flow of fuel toward said second valve means is prevented, said first valve means being displaced to its closed position in response to separation of the housing means at said plane, said second valve means having a closed position in which flow of fuel toward said first valve means is prevented, said second valve means being displaced to its closed position in response to separation of the housing means at said plane, and characterized by means for limiting the pressure downstream of the second valve means, when the housing means has separated.

2. An emergency valve adapted for installation at the base of a fuel dispensing unit with its lower end connected to a source of pressurized fuel and its upper end connected to conduit means extending, through the dispensing unit to a dispensing nozzle, said emergency valve comprising housing means, one end of which is adapted for rigid connection to a pressurized fuel source and the other end of which is adapted to be connected to the conduit means extending to the dispensing nozzle, said housing means, when installed, having a failure mode wherein, lateral forces thereon cause the upper portion of the housing means to separate from the lower portion thereof, without impairing the integrity of the respective connections of the housing means to the pressurized fuel source and the conduit means that extend to the dispensing nozzle, a main control valve mounted in the lower portion of the housing means, means for normally maintaining the main control valve in an open position and causing the main control valve to close upon separation of the upper portion of the housing means from the lower portion thereof, characterized by means, operative in response to separation of the upper portion of said upper housing from the lower portion thereof, for retaining fuel in the dispensing unit conduit means, and further characterized by means for limiting fuel pressure in the dispenser unit conduit means when fuel is retained therein by reason of a separation of said upper and lower portions.

3. An emergency valve as in claim 2 wherein the means for retaining fuel comprise a check valve mounted in the upper portion of said housing means, and means for maintaining the check valve in a closed position when said upper portion of the housing means is separated from the lower portion thereof.

4. An emergency valve as in claim 3 wherein the means for limiting fuel pressure in the dispenser unit conduit means comprises bleed valve means for limiting pressure in the conduit means to which the upper housing portion is connected when the upper portion is separated.

5. An emergency valve as in claim 4 wherein the check valve is a resiliently biased poppet valve comprising a slidable stem, and the bleed valve is mounted in the poppet valve.

6. An emergency valve as in claim 3 wherein the check valve is a poppet valve and is resiliently maintained in a closed position and opened by fuel flow pressure in the delivery of fuel.

7. An emergency valve as in claim 6 wherein a valve seat is formed in the upper portion of the housing means, the poppet valve comprises an axially disposed stem, and a sealing disc mounted on said stem and engageable with said seat, and a bridge is mounted in said upper portion of the housing means, above the valve seat, with the sealing disc disposed therebetween, the valve stem is slidably mounted in said bridge, and a compression spring is disposed between the bridge and the sealing disc for yieldingly maintaining the sealing disc in engagement with the valve seat.

8. An emergency valve as in claim 7 wherein means limit displacement of the poppet valve, in response to fuel flow, to a finite open position, the upper portion of the housing means has a chamber into which the sealing disc is displaced in the open position of the poppet valve, said chamber providing a flowpath having an area at least substantially equal to the area of the flow path below the poppet valve, thereby minimizing losses as fuel flows therepast.

9. An emergency valve as in claim 7 wherein said stem is tubular, a screw is threaded into and secures the sealing disc to the upper end of said stem, a bleed valve is mounted in said tubular stem, and a bleed passage extends axially of said screw to enable relief of pressure in the conduit means to which the upper housing is attached when said upper portion is separated.

10. An emergency valve as in claim 3 further wherein the check valve is a poppet valve comprising a stem and a sealing disc mounted on said stem, and stem bridge means guide the stem for axial movement within said upper housing means, spring means urge the poppet valve towards a closed position, and abutment means, mounted on the upper housing means, beneath said weakened portion, maintain the poppet valve in its open position, said abutment means releasing the poppet valve for movement toward its closed position upon separation of the upper portion of the upper housing means.

11. An emergency valve as in claim 10 wherein a valve seat is formed in the upper portion of the housing means, the sealing disc engages said seat in the closed position of the poppet valve, the stem bridge means comprise a bridge mounted in said upper portion above the valve seat, and the valve stem is slidably mounted in said bridge, the abutment means comprise an abutment bridge mounted in said upper housing portion and a post mounted on said abutment bridge, said post being aligned with and engaged by said stem, and the spring means comprise a compression spring disposed between the stem bridge and the sealing disc for yieldingly maintaining said stem in engagement with said post and maintaining the sealing disc in engagement with the valve seat upon separation of said upper portion.

* * * * *